(12) United States Patent
Prexler et al.

(10) Patent No.: US 11,458,686 B2
(45) Date of Patent: Oct. 4, 2022

(54) METHOD FOR CALIBRATING A DEVICE FOR PRODUCING A THREE-DIMENSIONAL OBJECT AND DEVICE CONFIGURED FOR IMPLEMENTING SAID METHOD

(71) Applicant: EOS GmbH Electro Optical Systems, Krailling (DE)

(72) Inventors: Michael Prexler, Munich (DE); Martin Schade, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 200 days.

(21) Appl. No.: 15/714,506

(22) Filed: Sep. 25, 2017

(65) Prior Publication Data

US 2018/0093416 A1    Apr. 5, 2018

(30) Foreign Application Priority Data

Sep. 30, 2016    (DE) .......................... 102016011801.6

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/153* (2017.08); *B29C 64/268* (2017.08);
(Continued)

(58) Field of Classification Search
CPC ... B29C 64/393; B29C 64/268; B29C 64/153; B29C 64/277; B33Y 50/02; B33Y 30/00;
(Continued)

(56) References Cited

U.S. PATENT DOCUMENTS

| 10,336,008 | B2 | 7/2019 | Perret et al. |
| 2010/0125356 | A1 | 5/2010 | Shkolnik et al. |

(Continued)

FOREIGN PATENT DOCUMENTS

| CN | 105358310 | 2/2016 |
| DE | 102013208651 | 11/2014 |

(Continued)

OTHER PUBLICATIONS

DE102013213547-A1 Google Translation (Year: 2015).*
Extended European Search Report for Application No. EP17192671.0 dated Feb. 28, 2018, 9 pages.

*Primary Examiner* — Francisco W Tschen
*Assistant Examiner* — Elisa H Vera
(74) *Attorney, Agent, or Firm* — Seyfarth Shaw LLP (57) ABSTRACT

A calibration method serves for calibrating a manufacturing device for additively producing a three-dimensional object by applying layer by layer and selectively solidifying a building material. The manufacturing device comprises at least two scanning units, each of which is capable of directing a beam to different target points in the working plane, which are located within a scanning region assigned to the respective scanning unit, wherein the scanning regions region of the at least two scanning units overlap in an overlap area. At least a first of the at least two scanning units is assigned a first monitoring unit whose monitoring region extends to a target point of the first scanning unit and its proximity, wherein a change of a position of the monitoring region is carried out as a function of a change of a position of the target point.

17 Claims, 7 Drawing Sheets

(51) Int. Cl.
*B33Y 30/00* (2015.01)
*B33Y 50/02* (2015.01)
*B29C 64/153* (2017.01)
*B29C 64/268* (2017.01)
*B29C 64/277* (2017.01)
*B22F 10/20* (2021.01)
*B22F 10/30* (2021.01)

(52) U.S. Cl.
CPC .............. *B33Y 10/00* (2014.12); *B33Y 30/00* (2014.12); *B33Y 50/02* (2014.12); *B22F 10/20* (2021.01); *B22F 10/30* (2021.01); *B29C 64/277* (2017.08); *Y02P 10/25* (2015.11)

(58) Field of Classification Search
CPC . B33Y 10/00; B33Y 50/00; B22F 2003/1057; B22F 3/1055
See application file for complete search history.

(56) References Cited

U.S. PATENT DOCUMENTS

| | | | |
|---|---|---|---|
| 2014/0319738 A1* | 10/2014 | El-Siblani | B29C 64/245 264/401 |
| 2016/0082668 A1 | 3/2016 | Perret et al. | |
| 2016/0144571 A1 | 5/2016 | Philippi | |
| 2016/0184893 A1 | 6/2016 | Dave et al. | |
| 2017/0320264 A1* | 11/2017 | Herzog | B22F 10/00 |

FOREIGN PATENT DOCUMENTS

| | | |
|---|---|---|
| DE | 102013213547 | 1/2015 |
| DE | 102015011013 | 2/2016 |
| DE | 102016200043 | 7/2017 |
| WO | 2015083104 | 6/2015 |
| WO | 2016081651 | 5/2016 |

* cited by examiner

METHOD FOR CALIBRATING A DEVICE FOR PRODUCING A THREE-DIMENSIONAL OBJECT AND DEVICE CONFIGURED FOR IMPLEMENTING SAID METHOD

TECHNICAL FIELD OF THE INVENTION

The present invention relates to a method for calibrating a manufacturing device for additively producing a three-dimensional object by applying layer by layer and selectively solidifying a building material, preferably a powder, and also to a device and a production method for producing a three-dimensional object layer by layer.

BACKGROUND OF THE INVENTION

Devices and methods of this type are, for example, used for rapid prototyping, rapid tooling or additive manufacturing. An example of such a method is known by the name "selective laser sintering or laser melting". Therein, a thin layer of a building material in powder form is repeatedly applied and the building material is in each layer selectively solidified by means of a laser beam by selectively irradiating positions in the so-called powder bed that correspond to a cross-section of the object to be produced.

It is known from document US 2016/0082668 A1 to scan an applied layer of a material along a cross-section of an object to be produced using two laser beams. For this purpose, the device comprises two scanners for deflecting the laser beams to predefined positions in the build area. In order to calibrate the device, test patterns are produced by solidifying the building material and said test patterns are detected by means of a camera and then analyzed. However, neither drifting of the system during the actual building process, for example by temperature influence, nor drifting over a longer period of time, for example by mechanical setting phenomena, can be compensated for.

SUMMARY OF THE INVENTION

The object of the present invention is to provide an alternative, respectively improved, device and an alternative, respectively improved, method for calibrating a manufacturing device for additively producing a three-dimensional object by applying layer by layer and selectively solidifying a building material.

The object is achieved by a calibration method according to claim 1, a production method according to claim 11, a computer program according to claim 12, a control device according to claim 13 and a manufacturing device according to claim 14. Further developments of the invention are each given in the dependent claims. Moreover, the methods can also be further developed by the features of the devices described below or given in the dependent claims, or vice versa, or the methods can also be further developed by the features of the other methods.

The calibration method according to the invention is used for calibrating a manufacturing device for additively producing a three-dimensional object by applying layer by layer and selectively solidifying a building material, preferably a powder, within a build area in a working plane. The manufacturing device comprises at least two scanning units, each of which is capable of directing a beam to different target points in the working plane, preferably in the build area, which are located within a scanning region assigned to the respective scanning unit, wherein the scanning regions of the at least two scanning units overlap in an overlap area. At least a first of the at least two scanning units is assigned a first monitoring unit whose monitoring region extends to a target point of the first scanning unit and its proximity (i.e. its vicinity), wherein a change of a position of the monitoring region is carried out as a function of a change of a position of the target point. The calibration method comprises the following steps: directing the monitoring region of the first monitoring unit to a region in the overlap area without a beam emanating from the first scanning unit, irradiating at least a portion of the monitoring region of the first monitoring unit with a beam via a second of the at least two scanning units, and evaluating an output signal of the first monitoring unit.

By doing so, the change of a position of the monitoring region can be carried out simultaneously or immediately after a change of the position of the target point or at a larger time interval, e.g. with a defined time offset. The simultaneous change is preferred.

Here, the scanning region of a scanning unit denotes an area in a working plane that comprises the build area, which area is scanned by a beam, i.e. can be stroked or swept. Preferably, the scanning region comprises at least a part of the build area. The surface area of the scanning region can have an arbitrary geometric shape, e.g. it can be circular, rectangular or polygonal. The overlap area can be an area in which two or more scanning regions overlap. If there are more than one overlap areas, they can adjoin each other or be continuous or be located separated from one another. Preferably, the overlap area comprises at least a part of the build area. The percentual overlap, i.e. the surface portion of a scanning region located in the overlap area, can be 100% and can preferably be between about 10% and about 90% of the area of the scanning region. The monitoring region is preferably located within the build area. It can have an arbitrary shape and, for example, comprise the entire build area. However, it can also be smaller than the build area, preferably smaller than the overlap area. The extent of the monitoring region within the build area advantageously requires a smaller deflection of the beams, which results in a higher precision. In addition, more freedom in building is enabled. Preferably, the monitoring region is circular with a diameter of at most about 30 mm, further preferred at most about three times a diameter of a incidence region of a focused laser beam in the build area.

The processes of evaluation and of calibration can be carried out at any time after detecting an input signal by a monitoring unit, for example, immediately after detection in real-time or at a time interval after the detection of an input signal, which time interval may be defined by additional conditions.

Since the monitoring region of the first monitoring unit comprises the target point of the first scanning unit, it is, for example, possible to detect a positional deviation of the two scanners from one another in a simple and fast manner and, if necessary, to compensate for this automatically. In addition, the calibration method according to the invention makes it possible, for example, to calibrate the scanners not only before production of a three-dimensional object, but also during its production, preferably several times during its production, by which the precision of the produced object can be improved. A precision can concern, for example, a dimensional accuracy or a surface texture or an internal feature of an object, in particular in regions of the object that extend over more than one scanning regions.

Preferably, the second scanning unit is assigned a second monitoring unit whose monitoring region extends to a target point of the second scanning unit and its proximity (i.e. its vicinity), wherein a change of a position of the monitoring region of the second monitoring unit is carried out as a function of a change of a position of the target point of the second scanning unit. Here, the calibration method comprises a step of evaluating an output signal of the second monitoring unit. By this, effects caused by the beam impacting on the building material, such as heating of the incidence region up to a resulting melt pool, can be monitored, for example. Alternatively or additionally, disturbances which simultaneously affect the output signal of both monitoring units and which are caused, for example, by arising smoke, smoulder or fumes, can be detected and, if necessary, compensated for.

Preferably, the calibration method comprises the following steps: directing the monitoring region of the second monitoring unit to an area within the overlap area without a beam emanating from the second scanning unit, irradiating at least a portion of the monitoring region of the second monitoring unit with a beam by means of the first scanning unit, and evaluating an output signal of the second monitoring unit. By using both beams and both monitoring units, the accuracy of the calibration can be further improved.

Preferably, the monitoring region of the first monitoring unit is limited to the target point of the first scanning unit and/or the second scanning unit and its proximity in the build area. By restricting the monitoring region, for example, the measurement accuracy can be improved and simpler monitoring sensors can be used.

Preferably, the beam of a scanning unit is a beam of a radiation suited for solidifying the building material, preferably laser radiation, and/or a target beam and/or a laser beam whose energy is not sufficient to solidify the building material. Thus, it is possible, for example, to carry out the calibration method during the building process and/or before, e.g. when configuring a manufacturing device, and/or afterwards and/or during an interruption of the building process. A laser beam whose energy is not sufficient to solidify the building material can be generated, for example, when laser radiation having an intensity which would be sufficient for solidification if slowly scanned over the build area is scanned over the build area so fast that at a position not enough energy is supplied to the building material for the building material to be solidified during the time in which the beam is scanned over that position.

Preferably, the monitoring region of the monitoring unit assigned to a scanning unit is in each case irradiated by the beam of a different scanning unit in the form of scanning, wherein said scanning is implemented preferably according to a predetermined pattern. With this method, for example, more information can be obtained from the output signal of the monitoring unit than when irradiating a fixed point. The predetermined pattern may be any pattern. It can, for example, comprise points and/or lines, for example a group of parallel lines (also called "hatch").

Preferably, the evaluation of the output signal includes determining an extreme value of the output signal and/or comparing a signal curve of the output signal with a predetermined comparison pattern. This makes it possible, for example, to detect an offset between the target positions of the two scanners.

Preferably, the calibration method is carried out for more than one region in the overlap area and/or the calibration method is carried out several times in succession, preferably at predetermined time intervals and/or after a predetermined number of applied layers, further preferred in each layer, and/or the calibration method is carried out dynamically by moving the beam of a scanning unit across the working plane, preferably the build area, and the monitoring region of a monitoring unit assigned to a different scanning unit following said movement and/or by moving the monitoring region of a monitoring unit assigned to a scanning unit across the working plane, preferably the build area, and the beam of a different scanning unit following said movement. Thus, for example, an offset between a target position of a laser beam, i.e. a coordinate or a range of coordinates in the working plane to which the laser beam is to be directed, for example, by controlling a respective scanner, and an actual position, i.e. an actual position of an incidence location of a laser beam in the working plane, can be detected not only at one location, but at several locations in the overlap area. Thus, for example, it is possible to detect, in addition to an offset, a rotation and/or dilation and to detect changes in a focal position of the laser radiation.

Preferably, a beam path of a radiation for monitoring the monitoring region of a monitoring unit is at least within a section thereof the same in a reversed direction as a beam path of a beam of a radiation suited to solidify the building material and/or a target beam and/or a laser beam whose energy is not sufficient to solidify the building material. By this, it can be achieved, for example, that a change of a position of the monitoring region is carried out automatically as a function of a change of the position of the corresponding target point. The term "beam path" is used in the present application such that a direction is assigned to it, as opposed to a purely geometric use of the term. The beam path of the laser beam runs from the laser to the build area, the beam path of the radiation used for monitoring from the build area to the monitoring unit.

Preferably, correction data for positioning at least one of the beams is determined from the evaluation of the output signal, wherein preferably a difference between a wavelength of a radiation used for monitoring the monitoring region of a monitoring unit and a wavelength of a radiation suited for solidifying the building material and/or a target beam and/or a laser beam whose energy is not sufficient to solidify the building material is incorporated for determining said correction data. This makes it possible, for example, to compensate for detected deviations between two scanners during the production of an object by appropriately controlling one or both scanners using the correction data.

The inventive production method for additively producing a three-dimensional object by applying layer by layer and selectively solidifying a building material, preferably a powder, comprises the steps: applying a layer of the building material in a build area within a working plane, solidifying the layer of the building material at positions that correspond to the respective cross-section of the object by selective irradiation within the build area by at least two beams of a radiation suited for solidifying the building material, preferably a laser radiation, and repeating the steps of applying and solidifying until the three-dimensional object is completed. While doing so, at least one such calibration method is carried out at least once before the building process and/or during the building process. Thus, for example, a three-dimensional object can be produced, wherein the deviations of the actual positions of both beams detected by the calibration method are compensated for.

The computer program according to the invention, which can be loaded into a programmable control unit, comprises program code means for executing all the steps of a calibration method according to the invention and/or a production method according to the invention when the computer program is executed on the control unit. As a result, it is possible to carry out the calibration or production method according to the invention controlled by a computer.

The control device according to the invention is suited for a manufacturing device for the additive production of a three-dimensional object by applying layer by layer and selectively solidifying a building material, preferably a powder. The manufacturing device comprises an application device for applying a layer of the building material to a build area within a working plane and at least two scanning units, each of them being configured to direct a beam to different target points in the working plane, preferably in the build area, which target points are located within a scanning region assigned to a respective scanning unit, wherein the scanning regions of the at least two scanning units overlap in an overlap area. At least a first of the at least two scanning units is assigned at least one monitoring unit whose monitoring region extends to a target point of the first scanning unit and its proximity, wherein a change of a position of the monitoring region is carried out as a function of a change of a position of the target point. The control unit is configured to control the manufacturing device such that it repeats the steps of applying and selectively solidifying until the object is completed and that it carries out a calibration method described above at least once before and/or during building of the object. With such a control device, it is, for example, possible to control a manufacturing device in such a way that the effects described above for the calibration or production method are achieved. The term "configured to" means that the control device (or also the manufacturing device mentioned below) is designed or adjusted in such a way that it can implement the corresponding processes or process steps upon operation.

The manufacturing device according to the invention for additively producing a three-dimensional object by applying layer by layer and selectively solidifying a building material, preferably a powder, comprises an application device for applying a layer of the building material to a build area within a working plane and at least two scanning units, each of them being configured to direct a beam to different target points in the working plane, preferably in the build area, which target points are located within a scanning region assigned to a respective scanning unit, wherein the scanning regions of the at least two scanning units overlap in an overlap area, wherein at least a first of the at least two scanning units is assigned at least one monitoring unit whose monitoring region extends to a target point of the first scanning unit and its proximity, wherein a change of a position of the monitoring region is carried out as a function of a change of a position of the target point. The manufacturing device is configured and/or controlled such that it repeats the steps of applying and selectively solidifying until the object is completed and that it carries out a calibration method described above at least once before and/or during building of the object. With such a manufacturing device, it is, for example, possible to detect a positional deviation of the two scanners from one another in a simple and fast manner and to calibrate the scanners even during the production of a three-dimensional object.

The monitoring unit preferably comprises an optical sensor which preferably comprises a photodiode and/or an optical sensor adapted for spatial resolution, preferably a CMOS or CCD sensor, wherein further preferred, the monitoring unit is designed as a camera. Thus, for example, a target point of a beam can be monitored in a simple manner. In the context of the present application, "optical" does not only refer to the range of visible light, but also the ranges of infrared or ultraviolet radiation adjacent thereto.

Components of the device that serve for carrying out the methods according to the invention can also be provided separately from the device as an equipping and/or retrofitting unit for equipping and/or retrofitting a manufacturing device. Thus, for example, a conventional manufacturing device can be equipped in advance with a corresponding equipping unit or retrofitted with a corresponding retrofitting unit. The equipping and/or retrofitting unit can, for example, comprise a computation unit and/or a storage unit which serves for storing comparison data, such as predetermined comparison patterns. Thus, for example, the control unit according to the invention can be provided as an equipping and/or retrofitting unit for a manufacturing device. The manufacturing device according to the invention can then also be a device that is equipped and/or retrofitted with such an equipping and/or retrofitting unit.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
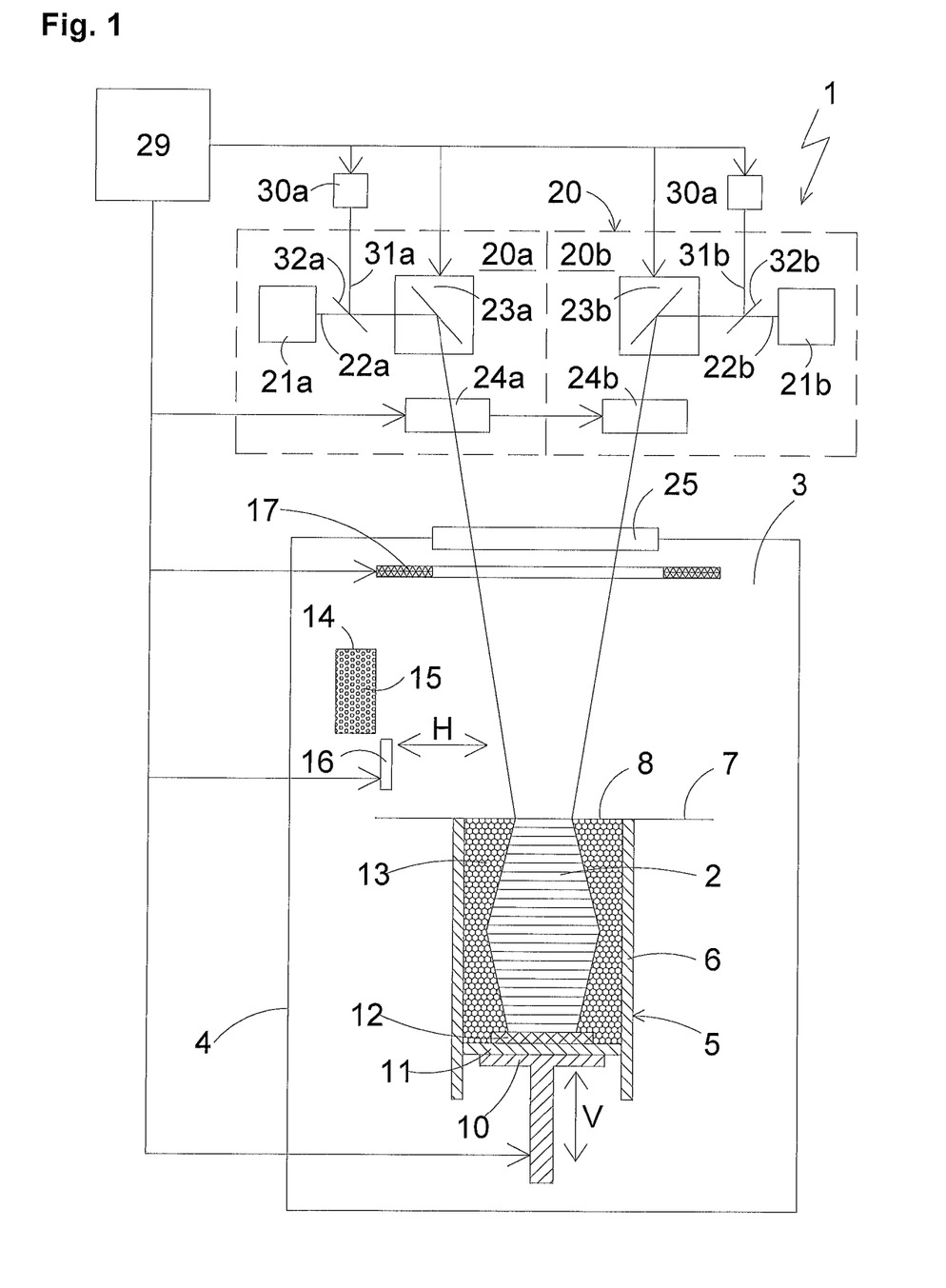
FIG. 1 shows a schematic view, partially in cross-section, of a device for additively producing a three-dimensional object which is configured for implementation of a calibration method according to the present invention.

Hereafter, a device configured for carrying out a calibration method according to the invention is described with reference to FIG. 1. The device shown in FIG. 1 is a laser sintering or laser melting device. For building an object 2, it comprises a processing chamber 3 with a chamber wall 4.

A container 5 open to the top with a container wall 6 is arranged in the process chamber 3. A working plane 7 is defined by the upper opening of the container 5, wherein the area of the working plane 7 located within the opening, which can be used for building the object 2, is referred to as build area 8.

In the container 5 a carrier 10 is arranged that can be moved in a vertical direction V and to which a base plate 11 is attached which seals the container 5 at the bottom and thus forms the bottom thereof. The base plate 11 can be formed as a plate separately from the carrier 10 which plate is fixed to the carrier 10, or it can be integrally formed with the carrier 10. Depending on the powder and process used, a building platform 12 can also be arranged on the base plate 11 as a building support, on which the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises a storage container 14 for a building material 15 which can be solidified through electromagnetic radiation and an application device 16 which is movable in a horizontal direction H for an application of the building material 15 within the build area 8. Optionally, a radiant heater 17 is arranged in the process chamber 3, which serves for heating the applied building material 15. As a radiant heater 17 an infrared heater can be provided, for example.

The laser sintering device 1 further comprises an exposure device 20. This exposure device is capable of scanning the build area 8 simultaneously with two laser beams. For this purpose, the exposure device 20 comprises in the present embodiment a first exposure unit 20a and a second exposure unit 20b. The first and second exposure units 20a, 20b each comprise a laser 21a, 21b which produces a laser beam 22a, 22b which is deflected by a deflection device (scanner) 23a, 23b and focused upon the working plane 7 by way of a focusing device 24a, 24b through a coupling window 25 which is arranged on the upper side of the processing chamber 3 in the chamber wall 4.

Each of the two exposure units 20a, 20b is assigned a monitoring sensor 30a, 30b (hereinafter referred to as a "sensor" for short), which is suited to detect radiation 31a, 31b emitted or reflected from the surface of an applied powder layer (hereinafter referred to as "radiation coming from the powder surface" for short) and to output an output signal corresponding to the detected radiation. The radiation coming from the powder surface preferably follows the same beam path as the laser beams 22a, 22b but in the opposite direction and is deflected at an arbitrary location within the beam path, in the present embodiment between laser 21a, 21b and scanner 23a, 23b, by means of a semi-transparent mirror 32a, 32b and directed to the sensor 30a, 30b. The semi-transparent mirrors 32a, 32b are designed such that they transmit the laser beams 22a, 22b (invisible infrared radiation, for example) produced by the lasers 21a, 21b substantially without loss or deflection and that they deflect the radiation 31a, 31b coming from the incidence region (visible red light from an incandescent metal melt, for example) towards the mirrors 33a, 33b substantially without loss. In the separate beam path of the radiation 31a, 31b coming from the powder surface further optical elements can be arranged that alter the beam path, such as lenses and/or filters, e.g. an F-theta lens as the focusing device 24a, 24b and/or the mirrors 33a, 33b shown in FIG. 2.

Preferably, the sensor 30a, 30b is an optical sensor for detecting an electromagnetic radiation, preferably in the range of visible light and/or in the range of infrared and/or ultraviolet, such as a photodiode. It can also be designed as an optical sensor adapted for spatial resolution, e.g. a CMOS or CCD sensor. Further preferred, the sensor 30a, 30b forms part of a camera that can comprise an image processing unit for evaluating the sensor data.

Finally, the laser sintering device 1 comprises a control unit 29 by which the individual components of the device 1 can be controlled in a coordinated manner in order to implement the building process. Alternatively, the control unit 29 can also be partially or completely arranged outside of the device. The control unit can comprise a CPU, the operation of which is controlled by a computer program (software). The computer program can be stored separately from the device on a storage medium from which it can be loaded into the device, in particular into the control unit.

During operation, in order to apply a powder layer, the carrier 10 is first lowered by an amount which corresponds to the desired layer thickness. The application device 16 first moves to the storage container 14 and receives therefrom a quantity of the building material 15 sufficient for applying a layer. It then moves over the build area 8 and there applies a thin layer of the building material 15 in powder form onto the building support or a previously existing powder layer. Application takes place at least over the entire cross-section of the object 2 to be produced, preferably over the entire build area 8, i.e. said portion of the working plane 7 bounded by the container wall 6. Optionally, the building material 15 in powder form is heated to a working temperature by means of a radiant heater 17. The cross-section of the object 2 to be produced is then swept (scanned) by the laser beams 22a, 22b, wherein scanning of the powder surface is preferably carried out according to a predetermined pattern in at least a section thereof. By doing so, the building material 15 in powder form is solidified at the positions corresponding to the cross-section of the object 2 to be produced. By doing so, the powder grains are partly or completely melted at these positions by the energy introduced by the radiation so that they exist joined together as a solid body after cooling. Here, for example, the first laser beam 22a can solidify a part of the object and the second laser beam 22b another part of the object. These steps are repeated until the object 2 is completed and can be removed from the processing chamber 3. Instead of producing one object, it is also possible to simultaneously produce two or more objects. By doing so, for example, the first laser beam 22a can solidify a part of the objects and the second laser beam 22b another part of the objects, or both laser beams can each solidify different regions of the objects.

Figure 2:
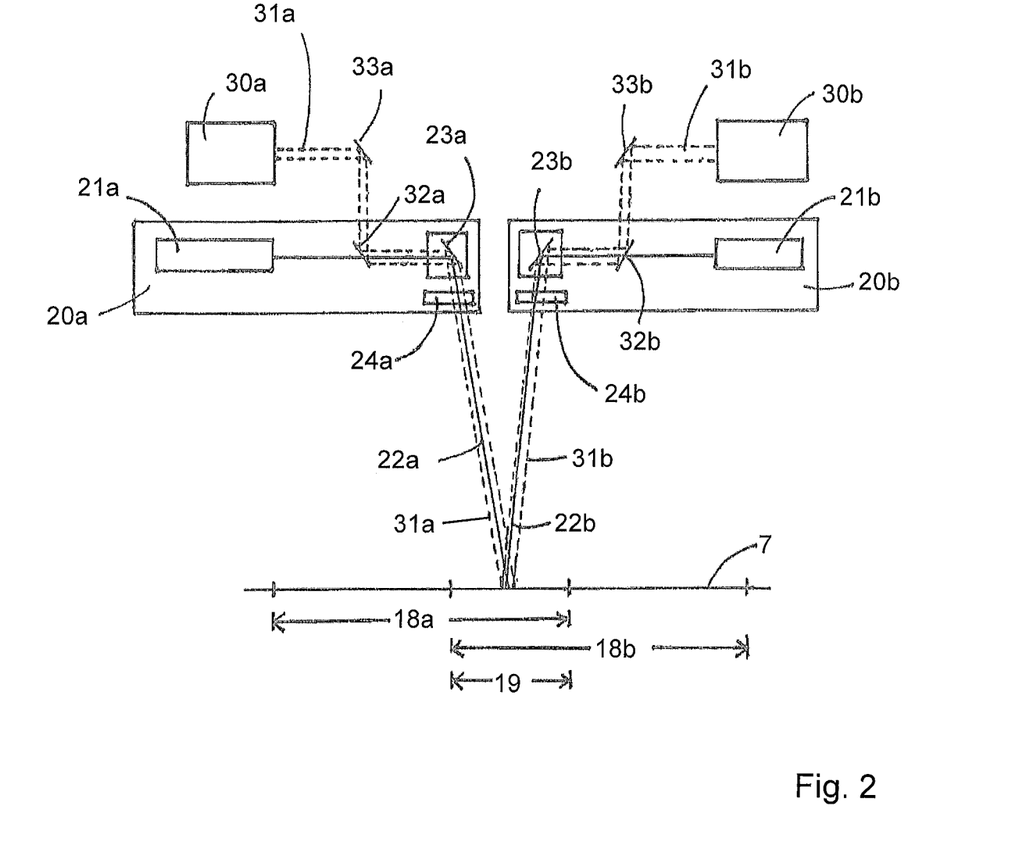
FIG. 2 shows a schematic view of a beam path within the device shown in FIG. 1.

FIG. 2 shows a schematic beam path in the laser sintering device 1. The first exposure unit 20a can direct the first laser beam 22a to positions within the first scanning region 18a in the working plane 7, and the second exposure unit 20b can direct the second laser beam 22b to positions within the second scanning region 18b in the working plane 7. The scanning regions 18a, 18b overlap in the overlap area 19, which both laser beams 22a, 22b can be directed to, wherein the overlap region 19 is preferably located within the build area 8.

In FIG. 2, the laser beams 22a, 22b, which are each represented by a solid line, are deflected and focused upon the working plane in such a way that they impinge at the same point of incidence or rather within the same incidence region, as even in the case of a focused laser radiation said laser beam always has a two-dimensional extension within the plane. The incidence region can have any shape, such as an oval, circular, polygonal or irregular shape. In the incidence region, at least partial melting of the building material can occur. This melt bath then emanates radiation i.a. upwards. From this radiation, a first beam 31a, which is represented by a dashed double line, is directed to the first sensor 30*a*, while a second beam 31*b*, which is also represented by a dashed double line, is directed to the second sensor 30*b*.

The radiation 31*a*, 31*b* thus follows in reversed direction the beam path of the laser beams 22*a*, 22*b* from their incidence regions in the working plane 7 up to the semi-transparent mirrors 32*a*, 32*b*. Thus, the first sensor 30*a* detects a first monitoring region in the working plane 7 that extends to the incidence region of the first laser beam 22*a* and its proximity. Analogously, the second sensor 30*b* detects a second monitoring region in the working plane 7 that extends to the incidence region of the second laser beam 22*b* and its proximity. The first or second monitoring region can, for example, be a circular measuring spot with a diameter of 10 mm. The monitoring region detected by the sensors 30*a* or 30*b* thus depends on the position of the incidence region of the corresponding laser beam 22*a* or 22*b*.

In order to ensure that the two laser beams 22*a*, 22*b* are focused on the same area within the working plane 7 when selecting the same incidence region, the exposure units 20*a*, 20*b* can be calibrated. In the context of the present application, the term "calibration", which is generally applied primarily to measuring devices, is to be understood analogously for a device for producing a three-dimensional object. The term "calibration" means that the deviation of an actual position (current position) of an incidence region of a laser beam in the working plane from the desired position (target position) to which the laser beam is to be directed, for example, by controlling the scanner, is detected. Correction data for the production of the object can be obtained from the detection of said deviation in at least one, preferably more than one, locations of the working plane. During production, control of the scanner can then be corrected using the correction data in such a way that the actual positions of incidence regions of the laser beam coincide as exactly as possible with the desired positions. In principle, by means of movably arranged scanning units, i.e. scanning units that are adjustable in two or three dimensions, a scanning unit can be adjusted by a physical change in its position or orientation. An e.g. electronic calibration by appropriately altering the control data of a mirror unit of a scanner is, however, structurally simple and inexpensive to implement.

In the context of the present application, a relative calibration of at least two scanners relative to one another takes place here. This means that the deviation between the actual positions of the scanners is detected when both are directed to the same target position. The so-called actual position of a first scanner 23*a* can be determined by means of a beam that is emanated by the scanner 23*a* or is deflected by a mirror unit of the scanner 23*a* and a position where it impacts on the build area 8 and/or the working plane 7. An actual position, i.e. an incidence position of a second scanner's 23*b* beam directed to the target position then shows whether or not a calibration of the two scanners 23*a*, 23*b* with respect to one another has to be carried out. For establishing a coincidence or non-coincidence between the actual position and the target position, i.e. an accuracy of a calibration, a predefined threshold value can also be taken into account in the calibration method according to the invention, such as a minimum distance of two incidence positions, and/or e.g. at least 90% agreement, which is assigned in a database to specific measured values, such as an overlap of incidence regions of two beams coming from different scanners. During building of the object, control of both scanners can then be corrected using the correction data such that their actual positions coincide as exactly as possible when they are directed to the same target position.

Hereafter, a first embodiment of a calibration method for the laser sintering device shown in FIG. 1 is described with reference to FIGS. 3*a, b*. In this case, the first laser 21*a* remains switched off, and the first scanner 23*a* is directed to a target point Z in the overlap area 19. Thus, the first sensor 30*a* detects a first monitoring region Ua with a center Z. In the example shown in FIG. 3*a*, the first monitoring region Ua is formed circularly with a predetermined radius, thus comprising the target point Z of the first scanner 23*a* and its proximity. Then, the second laser beam 22*b* is guided over the applied powder in a strip-shaped path S in such a way that its trace, i.e. a sum of its incidence regions passes several times through the first monitoring region Ua. In the case of the example shown in FIG. 3*a*, the incidence region of the laser beam 22*b* follows a pattern (hatch) with parallel lines at the same distance and in an alternating direction so that it passes through the first monitoring region Ua at three path sections 41, 42, 43. The width of each trace resulting from the lateral extent of the impact region is indicated by a hatching in FIG. 3*a*. In FIG. 3 the traces of the hatching pattern adjoin one another, but they can also overlap or have a spacing from one another. In doing so, a larger number of passages of the irradiation track through the measured area or the measuring spot can increase the accuracy of a subsequent calibration.

When the second laser beam 22*b* passes through the first monitoring region Ua of the first sensor 30*a*, a melt pool occurs at the incidence regions of the laser beam 22*b*, which melt pool emits radiation. A first part of this radiation 31*a* is detected by the first sensor 30*a* and said sensor generates an output signal, as shown in FIG. 3*b*. The output signal corresponds to a time curve of the detected intensity of the radiation 31*a*. Since the second laser beam 22*b* passes through the first monitoring area Ua at three path sections 41, 42, 43 as shown in FIG. 3*a*, the first sensor 30*a* registers three peaks 41', 42', 43' of the signal with different intensity maxima, wherein the intensity maximum of the middle peak 42' is higher than the maxima of the two other peaks 41', 43'. In this example, the height of the intensity maxima shown in FIG. 3*b* depends on a proximity of the track paths 41, 42, 43 to a target point or a center Z of the monitoring region or measurement spot Ua, because a sensitivity of the sensor 30*a* used uniformly decreases from the center Z of the light-sensitive area towards its edges. When a sensor with a sensitivity that is constant across the measurement area is used, a variation of the output signal can thus differ.

Figure 3A:
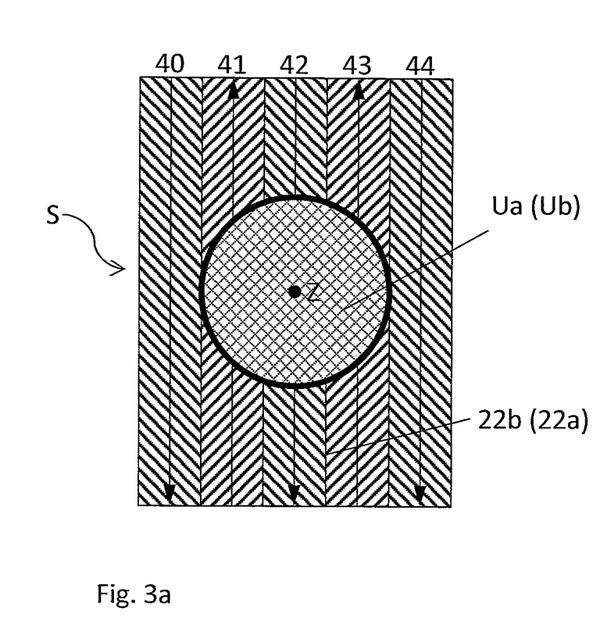
FIG. 3a shows a schematic top view of a powder layer to be solidified, wherein a monitoring region and a path of a incidence region of a laser beam for a calibration method according to a first embodiment of the present invention are depicted for the case that the path passes centrally through the monitoring region.
Figure 3B:
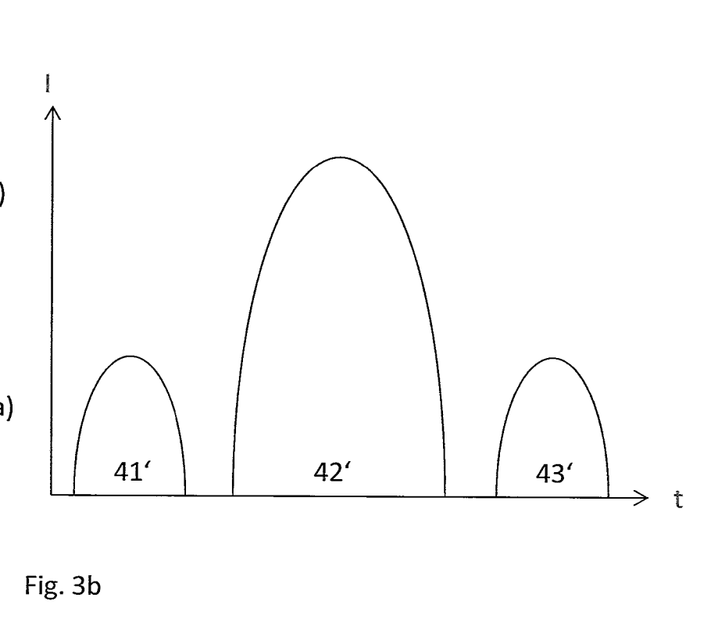
FIG. 3b shows a schematic output signal that is output from a sensor.
Figure 4A:
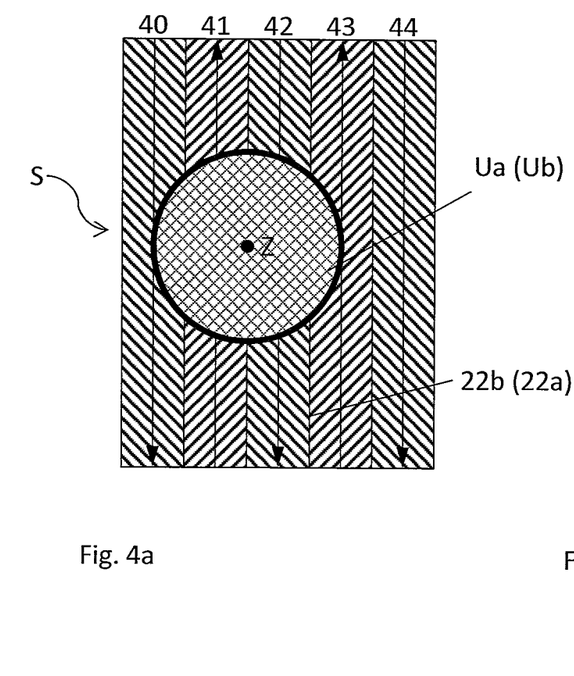
FIGS. 4a and 4b correspond to FIGS. 3a and 3b for the case that the path does not pass centrally through the monitoring region.
Figure 4B:
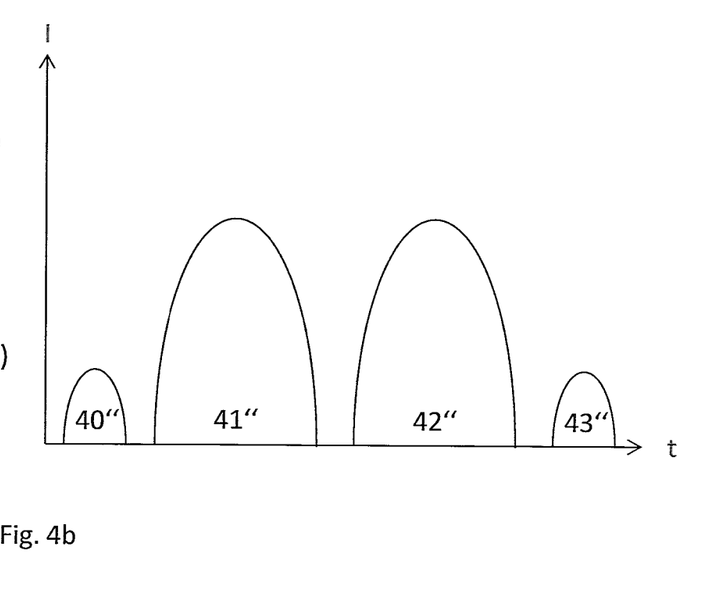

If the point Z is not located on an exposure line 42 of the second laser beam 22*b* as shown in FIG. 3*a*, the recorded intensity maxima and minima deviate from the intensity profile shown in FIG. 3*b* with respect to their height and/or their occurrence in time. Said case is illustrated in FIG. 4*a*, in which the point Z is located between two exposure lines 41 and 42, thus is offset in comparison to FIG. 3*a*. In this example, the second laser beam 22*b* passes through the first monitoring region Ua at four path sections 40, 41, 42, 43 so that the first sensor 30*a* registers four peaks 40", 41", 42", 43" of the signal, as can be seen from FIG. 4*b*. In this case, intensity maxima of the peaks 41", 42" are equally high and at the same time higher than intensity maxima of the peaks 40", 43". When compared to the peaks visible in FIG. 3*b*, the intensity maxima are—at otherwise the same conditions—each lower, both for the high peaks 41", 42" and for the low peaks 40", 43". This is explained by the offset of the point Z or the measurement area of the monitoring region Ua relative to the present exposure pattern or the path S of the laser beam 22b.

If FIG. 3a/b is taken as an example for a correct calibration of two scanners with respect to one another, according to which the actual and the target position of a scanner are identical, then in comparison FIG. 4a/b can be taken as an example of how an actual position of a scanner deviates from a target position in that a point Z is not located exactly on an exposure line or in a center of an exposure line as desired, but instead, for example, due to structural distortions during the operation of a laser sintering device, is located between two exposure lines extending parallel to one another or at an edge region of an exposure line. Such a relative positional deviation of the two scanners 23a, 23b to one another can be determined from the registered intensity maxima and minima using their height and/or time course and/or from a period duration and/or other features of the signal curves. Said determination is done, for example, by computing the position of the maxima and/or minima and/or by comparing the signal curve of the output signal of the first sensor 30a with stored comparison signal curves. Correction values can be defined from the determined positional deviation, with which the two exposure units 20a and 20b, preferably the two scanners 23a and 23b, can be adjusted in such a way that the positional deviation is compensated for. Alternatively or additionally, the scanners 23a, 23b can be adjusted relative to one another by means of correction values produced for test purpose until a differential signal of output signals from monitoring units 30a, 30b of both scanners 23a, 23b approaches zero.

The described calibration method makes it possible to detect a positional deviation of the two scanners from one another in a simple and fast manner and, if necessary, to compensate for this automatically. In addition, the calibration method permits, for example, a calibration of the scanners not only before the production of a three-dimensional object, but also at any time during its production, preferably several times during its production. By doing so, the precision of the object produced can be improved, for example in that changes due to temperature changes can be detected and, if necessary, compensated for.

Figure 5A:
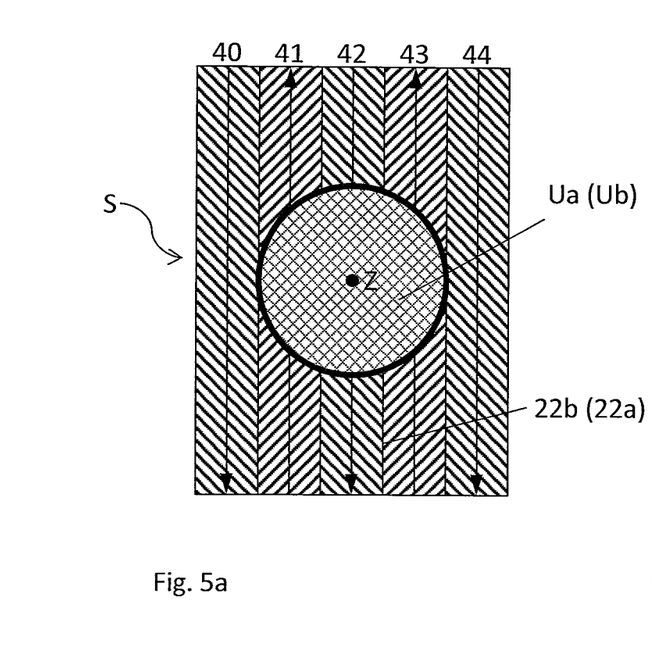
FIGS. 5a and 5b correspond to FIGS. 3a and 3b, wherein however a differential signal is formed from output signals that are output from two sensors.
Figure 5B:
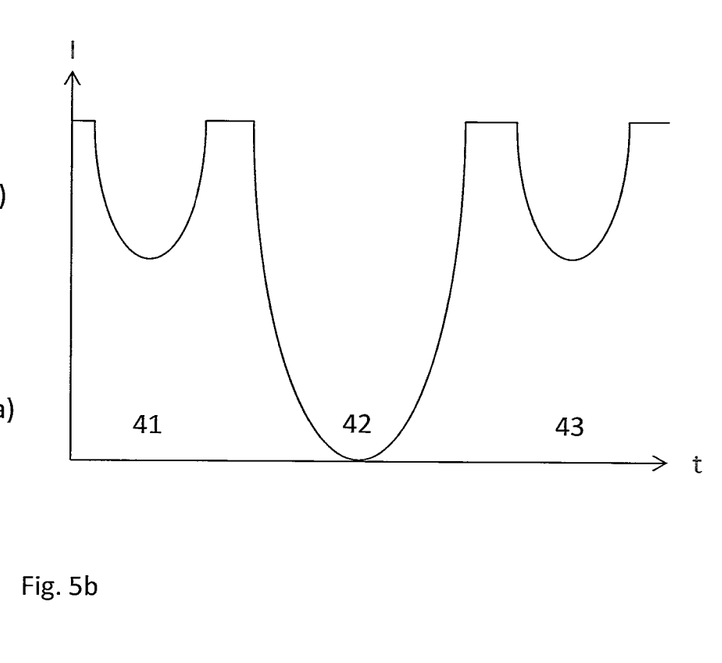

When the second laser beam 22b impacts on the powder surface, a melt pool is generated. In addition to the above-described procedure, this melt pool can be monitored using the second sensor 30b associated with the second scanner 23b. The monitoring region of the second sensor comprises the target point Z of the second scanner 23b, i.e. the incidence region of the second laser beam 22b on the powder surface, and its proximity. The output signal of the first sensor 30a can be compared with and related to the output signal of the second sensor 30b, e.g. can be normalized to or subtracted from its level. Thus, for example, FIG. 5a shows, like FIG. 3a, the laser beam 22b passing through the monitoring region Ua, and FIG. 5b shows the output of a differential signal from the output signals of the two sensors 30a, 30b. With this, for example, disturbances of the light path, such as a reduced intensity by shading or scattering, which are caused, for example, by smoke, vapors and/or splashes discharged from the melt pool, can be compensated for.

The calibration method can also be implemented such that, firstly, the monitoring region of the first sensor 30a is first scanned by the second laser beam 22b with the first laser beam 22a being switched off, as described above, and then the monitoring region of the second sensor 30b is scanned by the first laser beam 22a with the second laser beam 22b being switched off. By this double measurement the accuracy of the calibration can be improved.

Naturally, the roles of the first and second beam/scanner/sensor/monitoring region/etc. can be reversed in all of the approaches described above.

Furthermore, it is also possible that both exposure units 20a, 20b emit a beam and at least one, preferably both sensors detect the radiation 31a, 31b coming from the powder surface, which can be a visible or invisible radiation, such as light or heat.

The calibration method described can be carried out once before and/or during the building process. For continuously monitoring and recalibrating the exposure units 20a, 20b or the scanners 23a, 23b with respect to each other it is, however, advantageous to carry out the calibration method repeatedly, for example at predetermined time intervals, e.g. 1 second, 1 minute, or 1 hour, and/or after a predetermined number of applied layers, possibly even in each layer. Furthermore, the calibration can also be carried out in more than one regions of the overlap area 19 in one layer. If several objects are solidified at the same time, the calibration method can also be carried out only in regions that correspond to objects which are produced by both exposure units.

Calibration can take place during building of an object at positions of the respectively uppermost layer of the powder bed which positions are located within a cross-section of the object to be produced and are therefore to be solidified by the laser beam anyway. However, calibration can also take place at positions that are located outside the cross-section of the object to be produced or, if appropriate, are located outside the build area 8 in the working plane 7. For this purpose, one or several calibration object(s) can be additionally build in the overlap area, which are only built for the purpose of calibration. The calibration method can be limited to the areas within the overlap area that are actually irradiated by both scanners.

In the methods described above, deviations of the positions of the incidence regions can be detected in the working plane 7, preferably in the build area 8, in other words in a two-dimensional area. However, it is also possible to apply the calibration method in order to check focussing of the laser radiation and/or to detect tilting of a plane in which a laser beam 22a, 22b operates in a focused manner with respect to the working plane 7 or the build area 8 and, on this basis, to additionally adjust deviations of the scanners 23a, 23b to each other in a third dimension.

The laser radiation is typically focused such that a circular or oval incidence region within the surface of the powder layer has a desired diameter. In a focused state of the laser beam, the smallest beam diameter in the vicinity of the working plane, hereinafter referred to as "focus point" for short, is generally substantially located on the powder surface. If, as a result of tilting, the distance of the focus point from the powder surface changes, the diameter of the incidence region of the laser beam also changes. The reason for this is that when the laser beam is defocused, a minimal cross-sectional area of the laser beam lies in its course before or behind its incidence region in the build area so that the incidence region is larger than in a focused state. As a result, the energy density introduced into the powder is reduced, the powder is heated less, and the intensity of the radiation emitted by the powder decreases. This can lead to a reduced amplitude and an increased period length of the output signal at a similar signal curve.

If a method according to the first embodiment is carried out at several locations within the overlap area 18, in the case of a rectangular overlap area preferably near the four corners of the overlap area, such changes in spacing can be detected. By evaluating the amplitudes and/or period lengths of the output signals at the various measuring points, a change in the focal position and thus a tilting of the exposure device with respect to the build area or vice versa can be detected and, if necessary, corrected.

While the monitoring region is fixed in the above-described first embodiment and scanned by the laser beam, the monitoring region can also be moved during a calibration process.

Figure 6A:
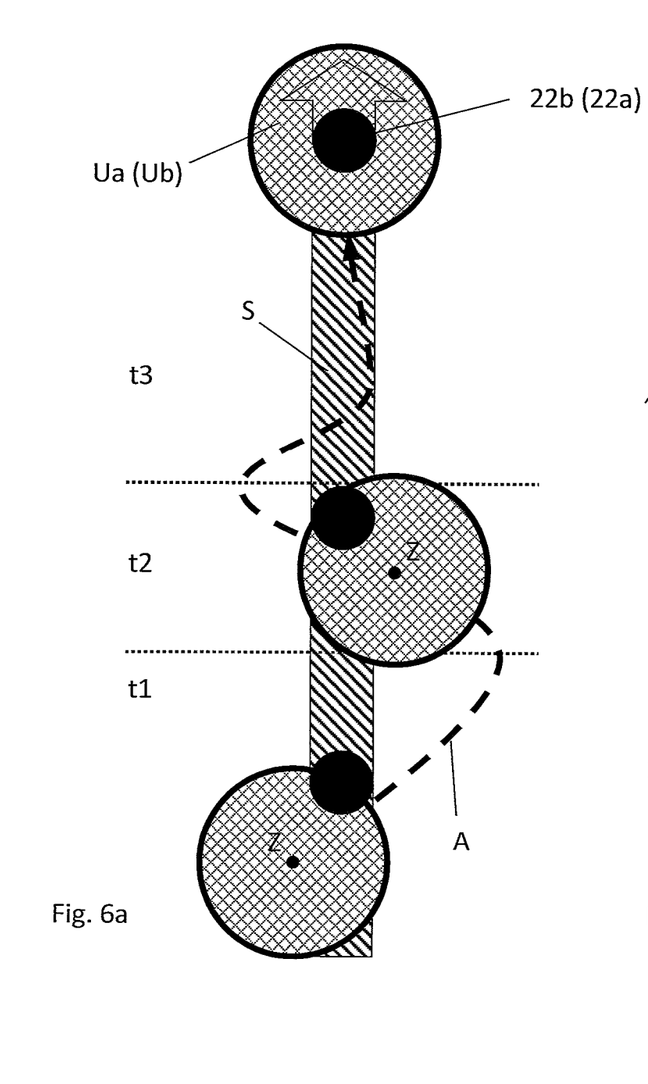
FIGS. 6a and 6d show schematic top views of a powder layer to be solidified, wherein each figure shows a path of a monitoring region and a path of an incidence region of a laser beam for a calibration method according to a second embodiment of the present invention.
Figure 6B:
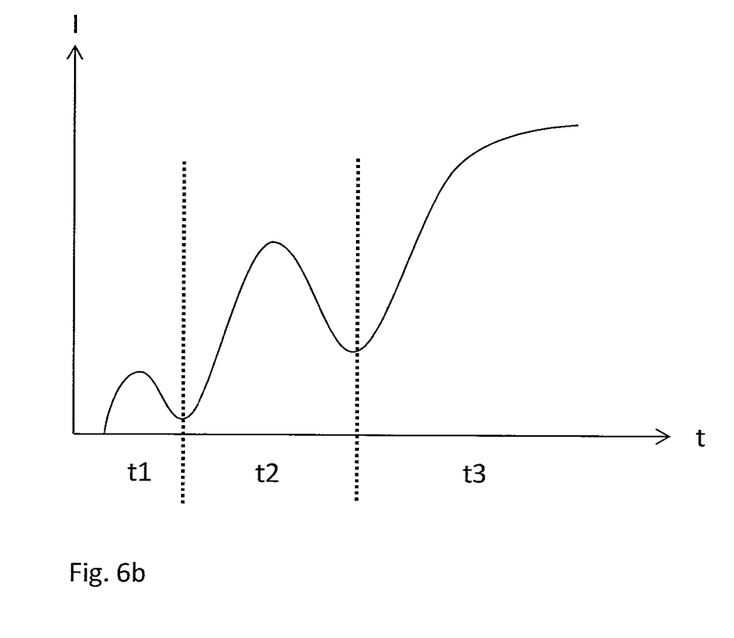
FIG. 6b shows an output signal of a sensor and FIG. 6c shows a differential signal from output signals of two sensors.
Figure 6C:
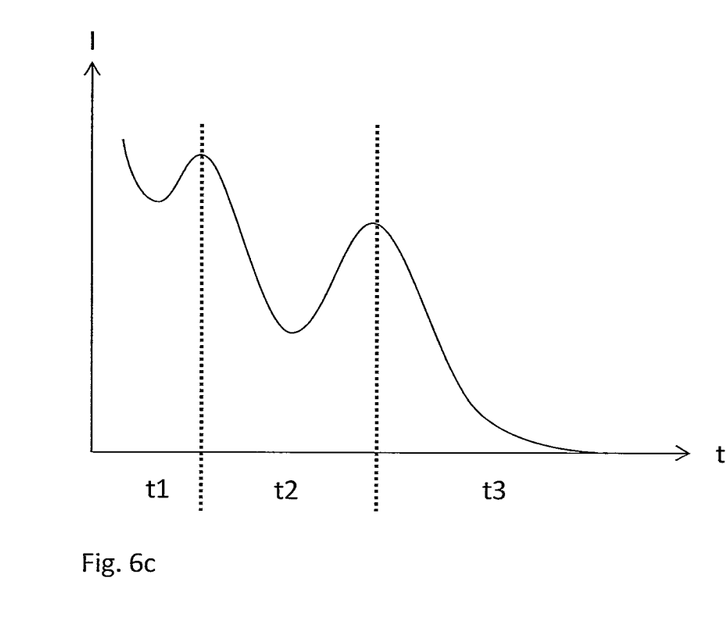
Figure 6D:
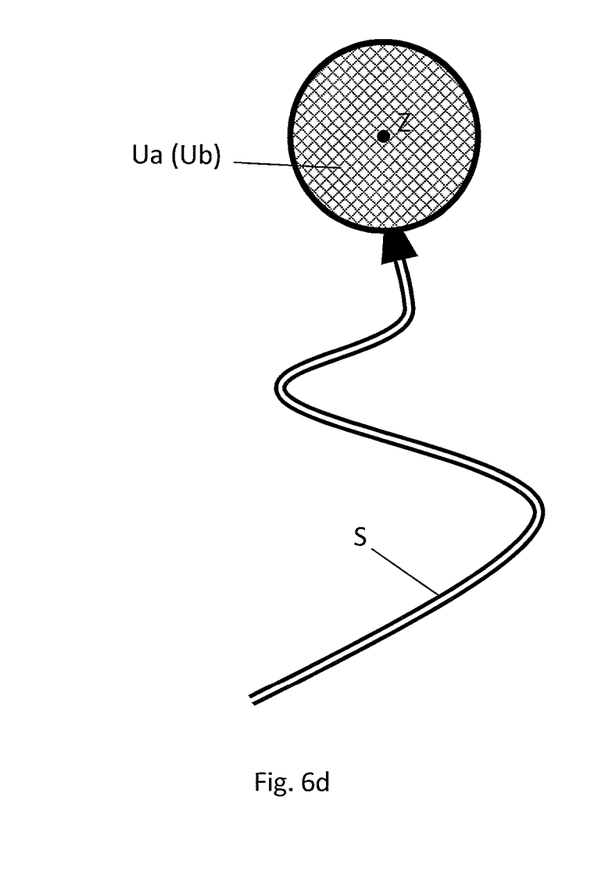

FIGS. 6a and 6d show two examples of such a dynamic, continuously implemented calibration according to a second embodiment. In the example shown in FIG. 6a, the laser beam 22b is guided via the second scanner 23b within the overlap area 18 in a path S over the powder surface. The first monitoring area Ua follows this movement by means of the first scanner 23a in such a way that its path crosses that of the second laser beam 22b several times. FIG. 6b shows an output signal of the first sensor 30a, wherein intensity maxima in the time periods t1, t2, t3 schematically correspond to the maximum approaches of the monitoring region Ua to the incidence region of the laser beam 22b shown in FIG. 6a at different locations of the path S, or in corresponding time periods t1, t2, t3. FIG. 6c shows a differential signal of the output signals of the two sensors 30a, 30b.

In the example shown in FIG. 6d, the first monitoring region Ua is guided within the overlap area 18 over the powder surface by means of the first scanner 23a. The laser beam 22b follows this movement by means of the second scanner 23b in such a way that its path crosses that of the first monitoring region Ua several times. The signals thus obtained are similar to those shown in FIGS. 6b and 6c.

The output signal can be evaluated, as in the case of the first embodiment, for example by determining the position of the maxima and/or minima or by comparing the signal forms with stored comparison signal curves.

Also in this embodiment the roles of the first and second scanner can be reversed. The paths of the laser beam and the monitoring region can be chosen arbitrarily as long as they enable an evaluation with which an offset between the target positions of the two scanners can be determined.

The features of the embodiments described above can be combined with each other as far as possible. For example, the detection of a focus deviation according to the second embodiment can also be performed dynamically.

According to the above-described embodiments, for a calibration a monitoring region is directed to the incidence region of a laser beam that serves for solidifying the building material. However, it is also possible to use a laser beam whose energy is not sufficient for solidifying the building material. Furthermore, a target beam of a laser (e.g. a pointer laser) can also be used and/or a further radiation source coupled into the beam path of the laser. If the beam that is used follows a slightly different beam path than the laser beam, this is taken into account in the evaluation of the output signal. In this case, the radiation coming from the powder layer is not a radiation emitted from a melt pool but a reflected and/or scattered radiation that impinges on the powder layer.

A possible chromatic aberration of the optical elements used, with possibly different wavelengths of the beam impinging on the powder surface and the radiation thereupon coming from the surface, can result in different refraction of the two types of radiation by means of the optical elements, which can result in a distorted image of the irradiation process observed by a monitoring unit. Therefrom resulting influences on the output signal of the monitoring sensor can be compensated for in the evaluation of the output signal, for example, by software.

In the embodiments described above, the measurement is evaluated based on an output signal of one or several sensors, which output signal represents a total intensity of the radiation incident on the sensor as an electrical signal. When using two-dimensional image sensors, e.g. CMOS or CCD sensors, which preferably each form part of a camera that can have an image-processing unit for evaluating the sensor data, there are, however, further possibilities for evaluation. The camera can, for example, be mounted coaxially with the scanner so that the optical axis of the scanner corresponds to the center axis of the camera. An evaluation unit coupled to the image processing unit can determine the position of the incidence region of the laser beam directly by means of a position of the image of said incidence region on the sensor or on the image generated by the image processing unit. The positional resolution is determined from the image ratio of the image of the incidence region and the resolution of the image-recording sensor. By means of such an evaluation, the time required for the calibration can be reduced and the calibration process can be carried out faster.

By means of a camera, however, further modifications of the calibration method are also possible. A camera with an image processing and evaluation unit can, for example, also be able to detect edges or other features of objects with a high accuracy. When a first scanner has irradiated a part of an object in a scan overlap area, a monitoring unit of a second scanner designed as a camera can recognize where the first scanner has stopped and the second scanner can then continue to build directly thereafter.

In other words, a monitoring unit of a second scanner 23b, which monitoring unit detects a solidification process of a first scanner 23a by means of a sensor 30b, for example using an image sensor with a suitably fine resolution which is adapted for spatial resolution, can check whether an actual position corresponds to a target position at an already solidified feature of an object in an uppermost layer of the building material. For this purpose, as the actual positions, for example, coordinates of an edge or corner of an object can be detected by the sensor 30b, can be compared to corresponding target positions, i.e. coordinates of exposure control data, and, if appropriate, an offset can be determined. The actual positions of the already solidified feature can then be defined as desired positions for the second scanner 23b and an orientation of the scanner 23b can be changed by means of correction values which were previously determined by means of an offset. An orientation of the first scanner 23a can thus be defined as leading and an orientation of the second scanner 23b can be adapted thereto. For example, the second scanner 23b can continue a building process exactly at a position at an object at which the first scanner 23a has fulfilled a part of the building process assigned to it or has completed a solidification process, although a calibration of the scanners 23a, 23b relative to one another is done only immediately before a start of the solidification by the second scanner 23b. This method has the considerable advantage that a calibration of two or more scanners relative to each other can also be carried out during a building process without compromising the quality of an object or abandoning a running building process or effecting a considerable loss of time.

Thus, if the two scanners need to be calibrated to one another, a calibration can take place in such a way that the second scanner recognizes features which have already been solidified by the first scanner and takes them as given and thus is adjusted electronically or mechanically according to the default of the first scanner.

The laser sintering device described above as an example comprises two exposure units, each exposure unit comprising a laser. However, an irradiation device with only one laser can also be provided, wherein the laser beam is, for example, deflected by means of a beam splitter to two separately controllable scanners so that the irradiation device is capable of generating two separately controllable laser beams. The sensors 30*a*, 30*b* are then assigned to the corresponding scanners.

Furthermore, the laser sintering device can also contain more than two exposure units and/or scanners. A scanning region can be assigned to each scanner, wherein the scanning regions can overlap in one or several overlap areas. Each overlap area can thus be irradiated by at least two, but possibly also by three or more lasers. A sensor is associated with at least one, preferably each exposure unit or at least one, preferably each scanner.

Even though the present invention was described by a laser sintering or laser melting device was described as an example of an additive layer-wise building device, the invention is not restricted to laser sintering or laser melting. It can be applied to any methods for additively producing a three-dimensional object by a layer-wise application and a selective solidification of a building material by scanning with an energy beam.

An exposure device can, for example, comprise one or several gas or solid-state lasers, or any other type of laser, such as laser diodes, in particular VCSEL (Vertical Cavity Surface Emitting Laser) or VECSEL (Vertical External Cavity Surface Emitting Laser), or an array of these lasers. In general, as an exposure device any device can be used with which energy as wave or particle radiation can be selectively delivered to a layer of the building material. Instead of a laser, for example, a different light source, an electron beam or any other source of energy or radiation suitable for solidifying the building material can be used.

Various materials can be used as a building material, preferably powders, in particular metal powders, plastic powders, ceramic powders or sand, filled or mixed powders.

The invention claimed is:

1. A calibration method for calibrating a manufacturing device for additively producing a three-dimensional object by applying layer by layer and selectively solidifying a building material, within a build area in a working plane, wherein the manufacturing device comprises at least a first scanning unit which is capable of directing a first beam to a first target point in the working plane and a second scanning unit which is capable of directing a second beam to a second target point in the working plane, the first scanning unit comprising a first mirror, where the first target point is located within a first scanning region assigned to the first scanning unit and the second target point is located within a second scanning region assigned to the second scanning unit, the first and second scanning regions of the first and second scanning units overlapping in an overlap area, the method comprising:
    locating the first and second scanning units in an upper region of a build chamber and spaced above the build area;
    providing a first monitoring unit which is suited to detect a radiation emitted or reflected from the surface of an applied powder layer, the first monitoring unit being spaced above the build area working plane with the scanning units, the first monitoring unit monitoring a first monitoring region on the working plane from above;
    controlling the first scanning unit to position the first target point in a region on the working plane within the overlap area without the first beam emanating from the first scanning unit;
    changing a position of the first monitoring region of the first monitoring unit on the working plane depending on a change of a position of the first target point of the first scanning unit on the working plane so that the first monitoring region comprises the first target point and its proximity, wherein the changing the position of the first target point of the first scanning unit on the working plane and the changing the position of the first monitoring region of the first monitoring unit on the working plane are performed simultaneously by the first mirror;
    irradiating at least a portion of the first monitoring region of the first monitoring unit with the second beam via the second scanning unit;
    detecting, by the first monitoring unit, the radiation emitted by the second beam; and
    evaluating an output signal of the first monitoring unit.

2. The calibration method according to claim 1, further comprising:
    providing a second monitoring unit which is suited to detect the radiation emitted or reflected from the surface of an applied powder layer, the second monitoring unit being spaced above the build area working plane with the scanning units, the second monitoring unit monitoring a second monitoring region on the working plane from above;
    changing a position of the second monitoring region of the second monitoring unit on the working plane depending on a change of a position of the second target point of the second scanning unit on the working plane so that the second monitoring region comprises the second target point and its proximity; and
    evaluating an output signal of the second monitoring unit.

3. The calibration method according to claim 2, wherein the calibration method is carried out in the overlap area several times in succession, by moving the second beam of the second scanning unit across the working plane, with the first monitoring region of the first monitoring unit following the movement.

4. The calibration method according to claim 2, wherein the second monitoring region of the second monitoring unit is limited to the target point of the second scanning unit and its proximity.

5. The calibration method according to claim 2, wherein the second scanning unit comprises a second mirror, and
    wherein changing a position of the second target point of the second scanning unit on the working plane and changing a position of the second monitoring region of the second monitoring unit on the working plane are performed by moving the second mirror.

6. The calibration method according to claim 1, further comprising:
    providing a second monitoring unit which is suited to detect a radiation emitted or reflected from the surface of an applied powder layer, the second monitoring unit being spaced above the build area working plane with the scanning units, the second monitoring unit monitoring a second monitoring region on the working plane from above;

controlling the second scanning unit to position the second target point in a region on the working plane within the overlap area without the second beam emanating from the second scanning unit;

changing a position of the second monitoring region of the second monitoring unit on the working plane depending on a change of a position of the second target point of the second scanning unit on the working plane so that the second monitoring region comprises the second target point and its proximity;

irradiating at least a portion of the second monitoring region of the second monitoring unit with the first beam via the first scanning unit; and evaluating an output signal of the second monitoring unit.

7. The calibration method according to claim 6, wherein the second monitoring region of the second monitoring unit is limited to the target point of the second scanning unit and its proximity.

8. The calibration method according to claim 6, wherein the second scanning unit comprises a second mirror, and further comprising:

changing a position of the second target point of the second scanning unit on the working plane and changing a position of the second monitoring region of the second monitoring unit on the working plane are performed by moving the second mirror.

9. The calibration method according to claim 1, wherein:
the first monitoring region of the first monitoring unit is limited to the target point of the first scanning unit and its proximity.

10. The calibration method according to claim 1, wherein the beam of at least one of the scanning units is a beam of a radiation suited for solidifying the building material.

11. The calibration method according to claim 1, wherein irradiating the first monitoring region of the first monitoring unit by the second beam of the second scanning unit is performed in the form of scanning, wherein the scanning is implemented according to a predetermined pattern.

12. The calibration method according to claim 1, wherein the evaluation of the output signal includes determining an extreme value of the output signal and/or comparing a signal curve of the output signal with a predetermined comparison pattern.

13. The calibration method according to claim 1, wherein a beam path of the radiation for monitoring the first monitoring region of the first monitoring unit is at least within a section of the first monitoring region but in a reversed direction as a beam path of the beam of a radiation suited to solidify the building material, or of a target beam whose energy is not sufficient to solidify the building material.

14. The calibration method according to claim 1, wherein correction data for positioning at least one of the beams is determined from the evaluation of the output signal, wherein a difference between a wavelength of a radiation used for monitoring the first monitoring region of the first monitoring unit and a wavelength of a radiation suited for solidifying the building material and/or a target beam and/or a laser beam whose energy is not sufficient to solidify the building material is incorporated for determining the correction data.

15. A production method for additively producing a three-dimensional object by applying layer by layer and selectively solidifying a building material, comprising the steps:

applying a layer of the building material in a build area within a working plane;

solidifying the layer of the building material at positions that correspond to a respective cross-section of the object by selective irradiation within the build area by at least two beams of a radiation suited for solidifying the building material; and repeating the steps of applying and solidifying until the three-dimensional object is completed, wherein a calibration method according to claim 1 is carried out at least once before a building process and/or during the building process.

16. The calibration method according to claim 1, wherein the beam of at least one of the scanning units is a target beam whose energy is not sufficient to solidify the building material.

17. The calibration method according to claim 1, wherein the calibration method is carried out in the overlap area several times in succession, by moving the first monitoring region of the first monitoring unit assigned to the first scanning unit across the working plane, and the second beam of the second scanning unit following the movement.

* * * * *